B. F. FLEGEL.
FISHING REEL.
APPLICATION FILED FEB. 2, 1909.
1,151,349.
Patented Aug. 24, 1915.
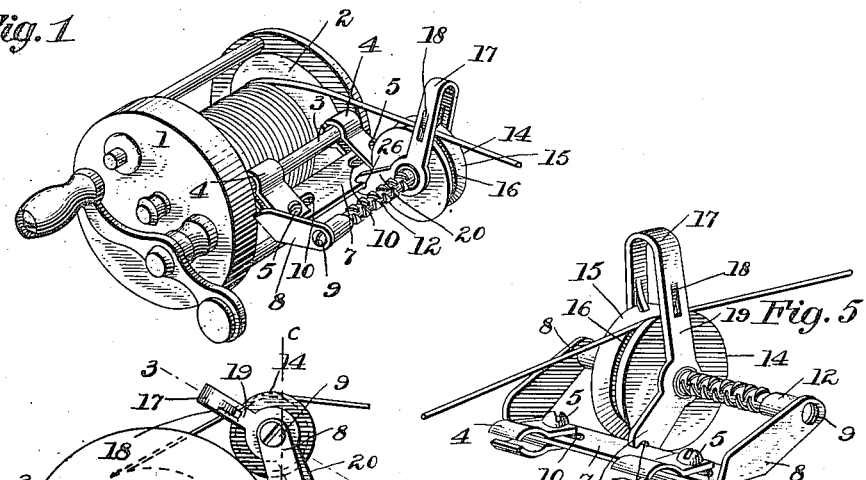
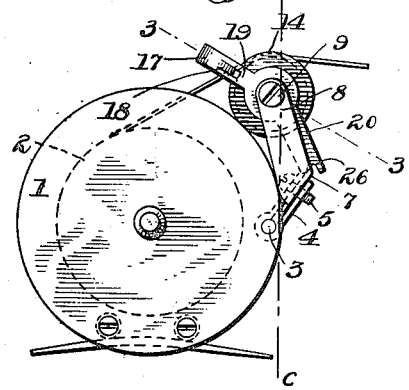
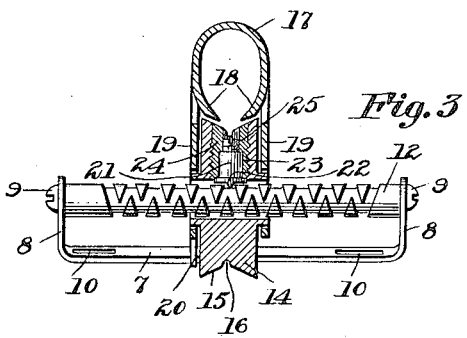
Witnesses:
J. B. Cole.
G. B. McCray.
Inventor:
Benjamin F. Flegel
By Geo. W. Upton
his attorney

UNITED STATES PATENT OFFICE.

BENJAMIN F. FLEGEL, OF RACINE, WISCONSIN, ASSIGNOR TO GEORGE W. UPTON, OF WARREN, OHIO.

FISHING-REEL.

1,151,349.    Specification of Letters Patent.    Patented Aug. 24, 1915.

Application filed February 2, 1909. Serial No. 475,710.

*To all whom it may concern:*

Be it known that I, BENJAMIN F. FLEGEL, a citizen of the United States, residing at Racine, in the county of Racine and State of Wisconsin, have invented certain new and useful Improvements in Fishing-Reels, of which the following is a specification.

This invention relates to a line guiding mechanism for fishing reels to lay the line evenly and regularly on the spool without manual guidance.

The objects of the invention are, first, to provide an attachment of the character stated which may be easily and quickly secured to any ordinary reel or removed therefrom; second, to provide an attachment which will operate only while the line is being wound upon the spool; third, to avoid unnecessary wear on the line either when going out or when coming in, and also the retarding of the speed of the bait when cast from the reel; fourth, to cheapen the cost and increase the effectiveness and lasting qualities of winding mechanism for fishing reels; and, finally, to insure the retention of the attachment or winding mechanism in its normal position by the pull on the line.

The invention will be hereinafter fully set forth and particularly pointed out in the drawings.

In the accompanying drawings, Figure 1 is a view in perspective of a reel with my improved winding attachment, showing the latter in the position it occupies after the bait has been cast. Fig. 2 is a side elevation with the winding mechanism in position to lay the line evenly on the spool, with parts shown by dotted lines. Fig. 3 is an enlarged view of the line guiding mechanism, partly in section. Fig. 4 is a view of the dog or guide pin, and Fig. 5 is a perspective of the mechanism ready for attachment to the pillar of a reel.

Referring to the drawings, 1 designates the reel; 2 the spool, and 3 the front pillar of the reel. My winding attachment may be secured to the reel by any suitable means, but for this purpose I have shown jaws 4 detachably held to pillar 3 by screws 5.

7 designates a pivoted frame which is shown in the form of a cross plate made of a stamping of a sheet of metal having its ends turned up to form arms 8, which at their outer ends support a non-rotatable right and left screw threaded rod 12, which is held fixed by screws 9, 9 at either end of said rod and is substantially parallel with the axis of the spool. In the base of this supporting frame are longitudinal slots 10 through which are passed screws 5 to hold the pairs of clamping jaws 4. These slots permit the cross plate 7 to be moved sidewise to center it on the reel and also permit the jaws 4 to be readily adjusted to reels having pillars and spools of different lengths. Preferably the supporting arms 8 are stamped up from the base of the pivoted frame 7, but they may be made of separate pieces.

14 designates a nut in the form of a wheel or trolley having a circumferential depression or V-shaped periphery 15 to guide the line to its center, wherein is formed a narrow groove 16 for the line to roll in.

17 designates a non-rotatable bail through which the line passes, and which has indentations 18 in either side, the inwardly projecting portions formed by such indentations overlapping the outer peripheral edges of nut 14 to guide the line into groove 16 and prevent its entrance between the nut and the sides 19 of the bail. The ends of these sides are journaled on the hubs of the nut 14, which is sleeved on to the threaded cross-bar 12 so that they may move laterally with the nut 14 the full length thereof, but to prevent the rotation of this bail, and hence to maintain an upright and proper position therefor, one of the sides 19 is extended to form an arm 20 the free end of which has a notch 26, for engaging the outer edge of the base or cross-plate of the pivoted frame 7, and to travel the length thereof as the nut travels to and fro on the threaded bar 12.

21 designates a dog or guide pin (see Figs. 3 and 4) set in nut 14, and having at its inner end a flange 22 which travels in threads of bar 12 as nut 14 is revolved, and thereby carries the nut and the bail back and forth longitudinally of said bar. This dog 21 is shown as located in a cylindrical cavity 23 of a screw 24 wherein it is retained against outward movement by an inner small screw 25, said screw 24 being fitted in an interiorly threaded opening of nut 14, the outer end of said screw 24 corresponding in shape to the periphery of the nut. When the screw 24 has been turned to position, the interior small screw 25 is screwed in until the crescent shaped lower edge 22 of guide pin 21 fits tightly against the bottom of the double thread of bar 12. It would then bind and prevent the turning of nut 14, wherefore a half turn back is given the small screw 25, thus insuring its easy movement in the thread and assuring its ever being in perfect adjustment to act as a guide or carrying finger for the nut 14 and the bail 17.

The adjustment described could be made by use of the screw 24, but doing so would interrupt the continuity of the groove 16 and the periphery 15, with which the top of the screw 24 conforms, in order to prevent cutting of the line.

In practice, when the top or outer end of a fishing rod is briskly thrown to cast a bait, the force of the motion throws outwardly the pivoted frame 7 upon which the winding mechanism is mounted. When in this position, as shown in Fig. 1, the line from the spool will pass through the bail and on through the first line guide of the rod approximately in a straight line, and the bail is made sufficiently large so that the line cannot contact therewith to an extent to materially retard its outward movement. After the bait has reached the water, the winding mechanism is swung upward toward the spool, that is to say, the supporting frame is turned on its pivot, which consists of the jaws 4 about the pillar of the reel, so as to throw the threaded rod and nut closer to the spool. The inward movement of the frame toward the spool is limited by the edge of one of the arms 8 of such frame engaging the cap of the reel, as shown in Fig. 2. When in this position the outer ends of the pivoted frame, and hence the threaded rod 12, are between the spool and a plane perpendicular to the fishing rod and parallel to the axle of the reel and tangent to the reel at its contact with the inner edge of the arm 8, of Fig. 2, and indicated by the broken line C—C in said Fig. 2. The tangential contact point of the line over the nut 14 is still farther behind said plane and, in consequence, the harder the fish pulls on the line the tighter the pivoted frame is held against the reel, and the pull of the line over the nut, from the spool to the first line guide, cannot pull the attachment back to the position shown in Fig. 1, which latter position it assumes only when positively forced outward either by hand or by the act of casting a bait. When the attachment is swung into the position shown in Fig. 2 the line is automatically guided into the central peripheral groove 16, and the inwardly extended portions of the bail formed by the indentations 18 insure the guidance of the line, prevent its getting between the nut 14 and the bail 17 and make it impossible for it to rest anywhere other than in the groove. As the line is wound in, it does not drag over the circumference of the nut or wheel, but rolls on the latter, traveling with it as the winding progresses.

The operation of the device is as follows: One of each of the pairs of the jaws 4 is swung in a line parallel to the length of the frame plate 7, after the screws 5 have been slightly loosened. The other parts of the jaws are placed under the forward pillar of the reel and the upper parts are then swung back over the pillar. The screws 5 are then tightened down sufficiently to require quite a sharp forward motion of the rod to bring the mechanism forward. After the bait strikes the water the frame is thrown upward, as far as it will go, with one of the angler's fingers, and, when he turns the crank to wind in the line mechanism will lay the line evenly on the spool.

I claim as my invention:—

1. A line winding mechanism for fishing reels comprising the combination of a reel frame, having a spool rotatably mounted therein, with a swinging frame mounted on said reel frame; a non rotatable right and left screw threaded rod mounted in said swinging frame; a rotatable nut engaging said rod and, at its periphery, adapted to be frictionally engaged by a fishing line; and an arm of said swinging frame formed to contact with the cap of the reel so as to position the axle of said nut in a plane between the axle of the reel and said point of contact.

2. A line winding mechanism for fishing reels comprising the combination of a reel frame, having a spool rotatably mounted therein, with a swinging frame mounted on said reel frame; a non rotatable right and left screw threaded rod mounted in said swinging frame; a rotatable nut engaging said rod and, at its periphery, adapted to be frictionally engaged by a fishing line, and an arm of said swinging frame formed to contact with the cap of the reel so as to locate the central tangential point of contact of the curve of the fishing line with the periphery of the nut, on a line between the axle of the spool and the point of contact of said frame with the cap of said reel.

3. A line winding mechanism for fishing reels comprising, in combination, a reel-frame, a spool located within the reel-frame, a line-guide parallel with the axis of said spool, and a pivoted frame for supporting such line-guide in either active or inactive positions, such line-guide being automatically held in its operative position wholly by the pull of the line.

4. The combination with a reel-frame and a spool rotatably mounted therein, of a line winding attachment, a swinging frame for the latter, clamping members for securing said swinging frame to the reel-frame, and
5 means for adjustably connecting said clamping members to the swinging frame.

In testimony whereof I affix my signature in presence of two witnesses.

BENJAMIN F. FLEGEL.

Witnesses:
   JNO. W. KNIGHT,
   A. L. ANDERSON.